United States Patent
Bowker

[15] 3,696,249
[45] Oct. 3, 1972

[54] DETAIL BOUNDARY DETECTION SYSTEMS

[72] Inventor: John Kent Bowker, Marblehead, Mass.

[73] Assignee: Itek Corporation, Lexington, Mass.

[22] Filed: Sept. 14, 1970

[21] Appl. No.: 71,816

[52] U.S. Cl. ..........250/220 M, 178/6.8, 250/219 FR
[51] Int. Cl. .............................................H04j 39/12
[58] Field of Search....250/202, 203 R, 203 CT, 206, 250/208, 209, 220, 219 FR; 309/311; 178/6, 6.8, 7.5, 5.2 R, 5.2 A, DIG. 2, DIG. 3

[56] References Cited

UNITED STATES PATENTS

| | | | |
|---|---|---|---|
| 3,502,880 | 3/1970 | Martinek | 250/202 |
| 3,553,360 | 1/1971 | Land | 178/6.8 |
| 3,418,478 | 12/1968 | Falbel | 250/202 |
| 3,159,743 | 12/1964 | Brouillette | 250/202 |
| 3,258,599 | 6/1966 | Zuckerbraun | 250/203 CT |
| 3,532,892 | 10/1970 | Murphy | 250/203 |
| 3,470,377 | 9/1969 | Febre | 250/202 |
| 3,019,343 | 1/1962 | Henry | 250/202 |
| 2,934,653 | 4/1960 | Holst | 250/220 |
| 2,854,883 | 10/1958 | Jones | 250/220 |
| 3,340,400 | 9/1967 | Quittner | 250/220 |

*Primary Examiner*—James W. Lawrence
*Assistant Examiner*—D. C. Nelms
*Attorney*—Homer C. Blair, Robert L. Nathans and John E. Toupal

[57] ABSTRACT

Disclosed are detection systems that systematically scan given areas of an object to locate detail boundaries therein. The systems compare radiant energy levels emanating from two-dimensionally spaced apart sub-divisions of each scanned area so as to produce an output signal that represents energy level gradients but is independent of gradient orientation with respect to the direction of scan.

26 Claims, 13 Drawing Figures

PATENTED OCT 3 1972 3,696,249
SHEET 1 OF 6
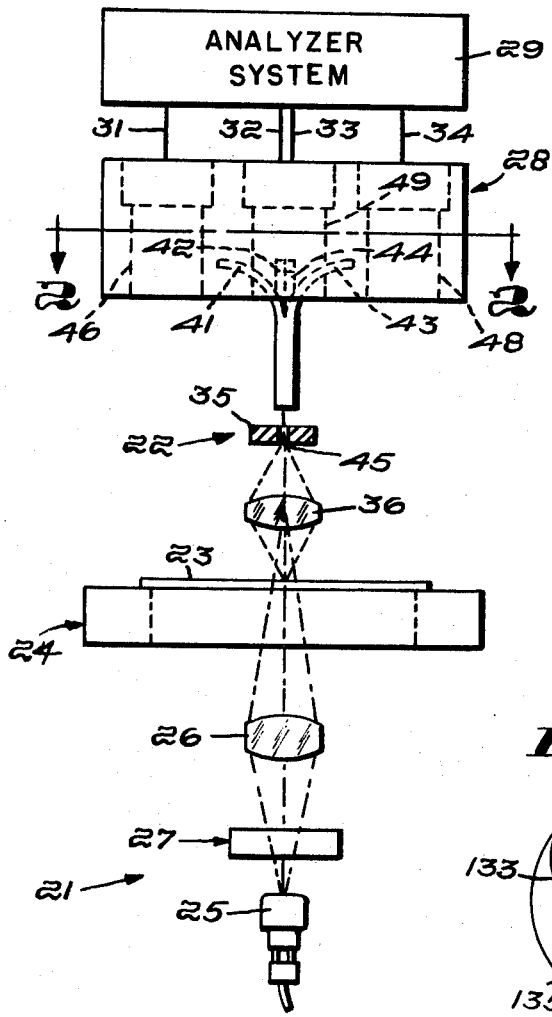
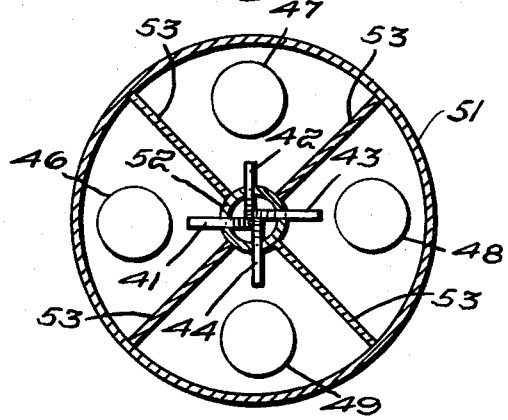
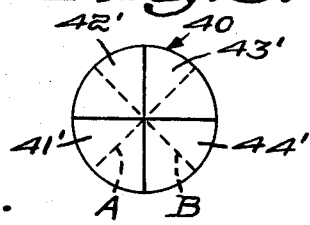
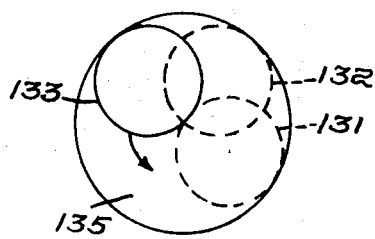
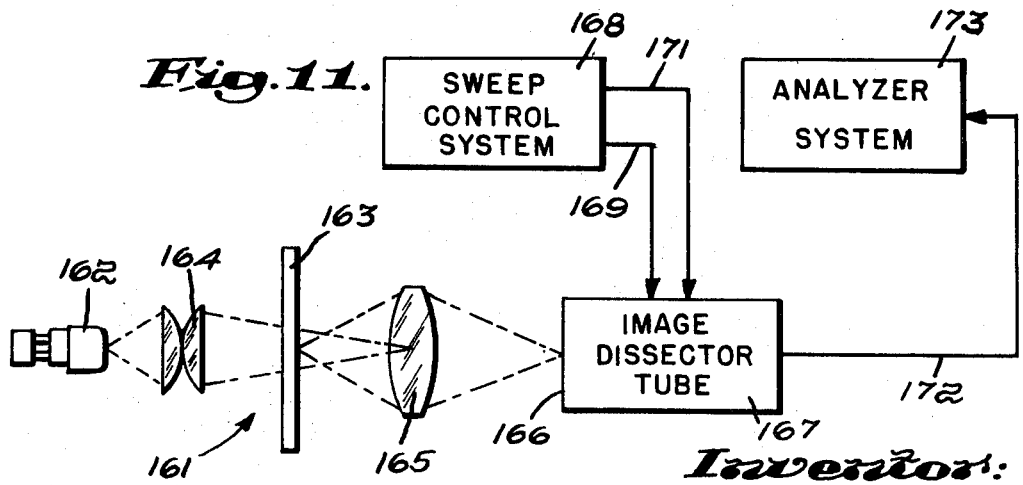
Inventor:
John Kent Bowker,
by John E. Toupal
Attorney

PATENTED OCT 3 1972

Inventor:
John Kent Bowker,
by John E. Toupal
Attorney

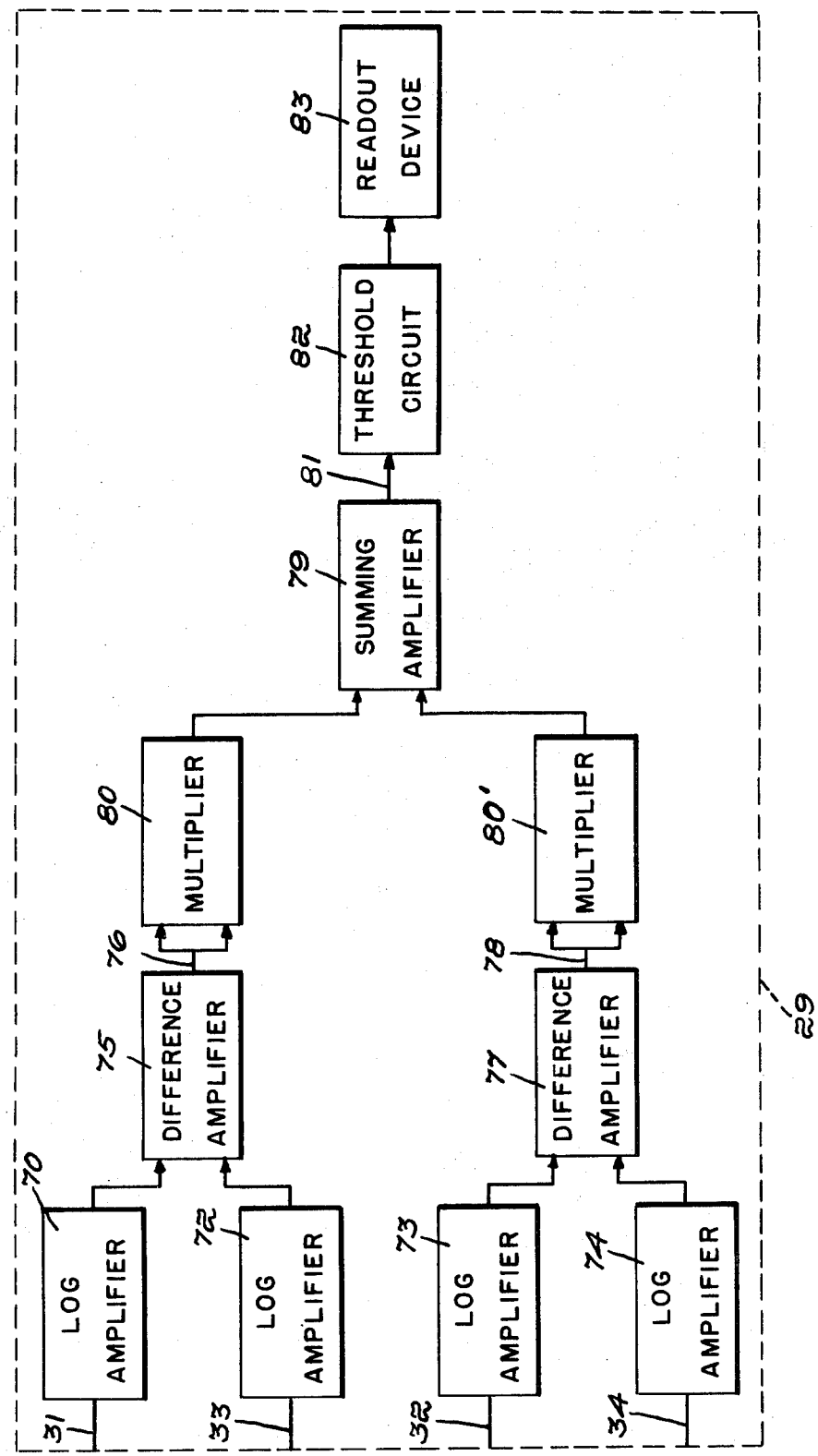

Inventor:
John Kent Bowker,
by John E. Toupal
Attorney

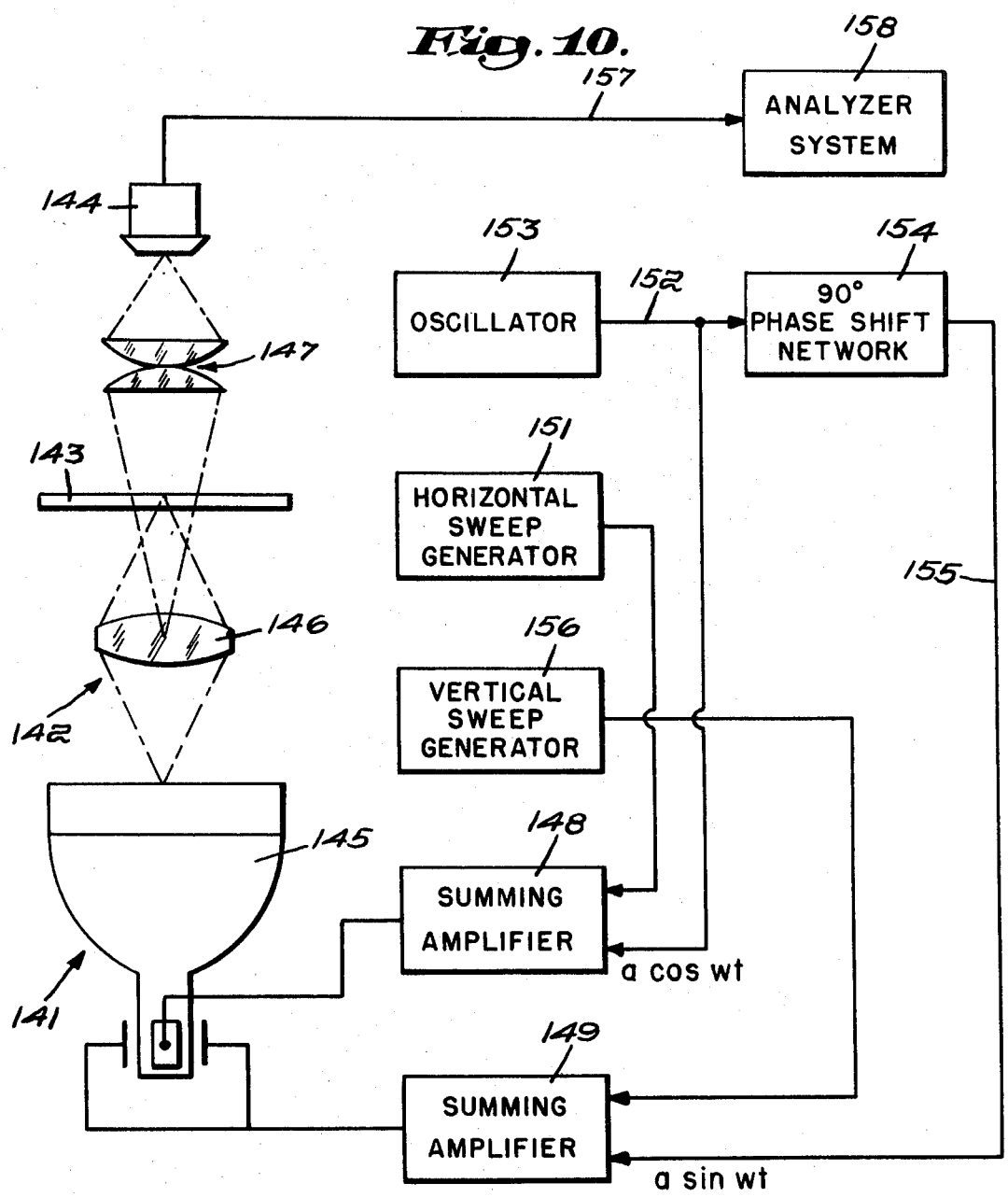

DETAIL BOUNDARY DETECTION SYSTEMS

BACKGROUND OF THE INVENTION

This invention relates generally to a system for locating detail boundaries in objects and, more particularly, to such a system in which the boundaries are located by detecting gradients in the levels of radiant energy emanating from the object.

There exist various circumstances in which one wishes to distinguish detail boundaries or outlines from other detail in a given object. In some instances a permanent record of the detected boundary outline is desired while in others the outline may be desired merely for instantaneous observation or for some output function. The instant invention is specifically concerned with the production of lines representing detail boundaries in either black and white or color transparencies. Other applications for boundary detail detectors include, for example, interpretation of medical X-rays, automatic machine reading of printed material, intensifying object outlines in television pictures, isolating specific objects such as aircraft from their surroundings, etc.

Previous detail boundary detection systems typically employ video scanners that generate video signals representing detail intensity along paths in an object being examined. Signal level gradients representing detail boundaries are then detected either by differentiating the signals or by comparing the video signal with a time delayed facsimile thereof. Detection systems of these types are disclosed in U.S. Pats. Nos. 2,851,522 and 3,361,872. The principle disadvantage of these prior systems is that detection capability is not independent of boundary orientation. For this reason, complete boundary information is obtained only by orthogonal scans that both complicate the analysis and recording of the output information and increase the time required for examining a given object.

The object of this invention, therefore, is to provide a system that detects detail boundaries in particular objects more efficiently than do previously known boundary detection systems.

SUMMARY OF THE INVENTION

The invention is characterized by the provision of a system for locating detail boundaries present in particular objects. An energy transmission system transmits radiant energy from a plurality of two dimensionally spaced apart area sub-divisions of a given area on the object. The sub-divisions are limited in number and each comprises a substantial portion of the given area. Receiving the transmitted energy is a receiver that produces signal values dependent on the radiant energy levels emanating from the area sub-divisions. An analyzer produces a gradient detection signal dependent on signal value differences resulting from detail boundaries caused variations in the radiant energy levels emanating from the area sub-divisions. Examination of the object's entire surface is provided by a scanning mechanism that systematically changes the location in the object of the given area from which energy is transmitted to the receiver. Because the compared energy levels emanate from two-dimensionally spaced apart area sub-divisions, the gradient detection sensitivity of the system is independent of detail boundary orientation with respect to the direction in which the object is scanned by the scanning mechanism. Consequently, detail boundaries of all orientations can be located with a scanning pattern the lines of which are all parallel. Thus, the requirement for more complex and time consuming orthogonal scanning techniques is eliminated.

An important feature of the invention entails the use in the signal analyzer of a logarithmic amplifier that applies a logarithmic response characteristic to the gradient detection signal. The logarithmic amplifier provides a step response to energy level gradients that is independent of signal level. For this reason the system exhibits equal boundary detection sensitivity in both shadow and highlight areas of an object. This feature provides an additional advantage for applications desiring to approximate human response to a color object. Because color is a psychologically perceived attribute of light and psychological response is logarithmic, the output produced by the logarithmic amplifier for a color object closely parallels human visual response to that display.

In a preferred embodiment of the invention, the area sub-divisions lie in quadrant portions of the given area and the energy transmission system isolates the energy emanating from each of the quadrant sub-divisions. Separate energy detectors receive energy from each of the quadrant sub-divisions and produce separate output signals having values representing the levels of energy received. The analyzer circuit produces a first signal dependent on the difference between the signal values representing radiant energy levels from one diagonal set of the quadrant sub-divisions and a second signal dependent on the difference between the signal values representing energy levels from the other diagonal set of quadrant subdivisions. The first and second output signals are first squared to provide outputs independent of boundary detail orientation and are then summed to produce the gradient detection signal. By isolating energy emanating from quadrant sub-divisions of the scanned area and appropriately operating on the resultant output signals, the system is rendered equally sensitive to detail boundaries of all orientations in the area being scanned. Detail boundaries corresponding to a desired minimum gradient are detected by applying the gradient detection signal to a suitable threshold device. The output of the threshold device can be used to provide either a temporary display or a permanent record of the detail boundary pattern detected.

According to another embodiment of the invention, the energy transmission system includes a sweep control that continuously changes the sub-division of the given scanned area from which emanating radiant energy is received by the receiver. The output of the receiver is an alternating signal with an amplitude dependent on the energy levels emanating from the continuously changing area sub-divisions. Detail boundary created energy gradients in the scanned area are represented in the output signal by a signal component at the frequency employed for the sweep control. Isolation of that frequency component with a suitable band-pass filter provides a gradient detection signal that is responsive to detail boundaries of all orientations in the scanned areas.

A preferred sweep control mechanism for continuously changing area sub-divisions includes a rotating optical element that directs a beam of radiant energy in a circular path within the scanned given area on the object under examination. The detail modulated energy beam emanating from the object is received by an energy detector that produces the alternating out-put signal. This system is particularly well suited for locating detail boundaries in photographic transparencies in which case the rotating light beam is directed through the transparency. The scan control in this system preferably is an x-y stage that moves the transparency in orthogonally related directions relative to the rotating light beam.

Another preferred sweep control mechanism comprises a cathode ray tube that directs a light beam through an examined object. Applied to the deflection coils of the tube are signals that produce circular motion of the light beam during its movement along paths that systematically scan the entire object. In a modified version of this embodiment the object is imaged on the cathode of an image dissector tube. Again the scanning beam of the tube is deflected in a circular motion as it traverses the object in a systematic scan. In either case, the circular motion of the beam produces the continuous changes in the area sub-divisions from which radiant energy is received and detected to produce the alternating gradient detection signal.

DESCRIPTION OF THE DRAWINGS

These and other objects and features of the invention will become more apparent upon a perusal of the following description taken in conjunction with the accompanying drawings wherein:

FIG. 1 is a schematic view of the preferred embodiment of the invention;

FIG. 2 is a cross-sectional view taken along lines 2—2 in FIG. 1;

FIG. 3 is an exploded view of a viewed area provided by the optical system shown in FIGS. 1 and 2;

FIG. 5 is a schematic block diagram of an analyzer circuit for use with the embodiment shown in FIG. 1;

FIG. 8 is an exploded view of a viewing area provided by the optical system shown in FIG. 6;

FIG. 10 is a schematic view of another preferred embodiment of the invention;

FIG. 11 is a schematic view of another preferred embodiment of the invention;

DESCRIPTION OF THE PREFERRED EMBODIMENTS

Figure 4:
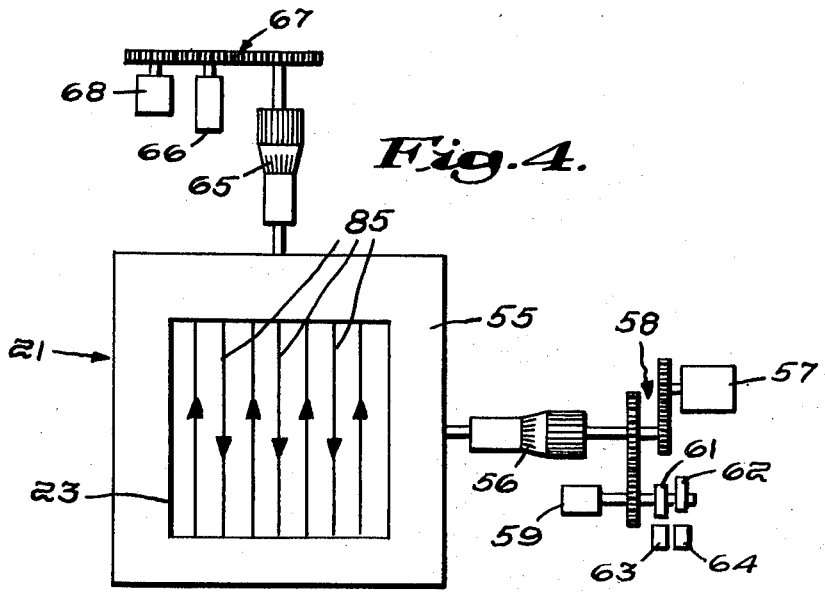
FIG. 4 is a schematic view of an x-y transport mechanism for use with the embodiment shown in FIG. 1.

Referring now to FIG. 1, there is shown a detail boundary detection system 21 including an optical transmission system 22 for transmitting light energy emanating from an object 23 mounted on an x-y transport mechanism 24. The object 23 can be, for example, a photographic transparency and the x-y transport mechanism 24 is described in greater detail below. Light produced by a lamp 25 is directed through the transparency 23 by a condenser 26 after being filtered in a filter assembly 27. Receiving light energy from the transmission system 22 is a radiant energy responsive receiver 28 that supplies output signals to an analyzer circuit 29 on signal lines 31–34. The analyzer circuit 29 also is described in greater detail below.

Optical transmission system 22 includes an apertured mask 35 placed at the focus of an imaging objective 36 and in front of four integrally mounted rectangular light pipes 41–44, also shown in FIG. 2. The light pipes 41–44 are arranged to divide the light beam transmitted by an aperture 45 in the mask 35 into four equal pie-shaped sections 41'–44' shown in the exploded view of FIG. 3. Receiving light transmitted by each of the light pipes 41–44, respectively, are four photomultipliers 46–49. As shown in FIG. 2, the photo detectors 46–49 are mounted between concentric shells 51 and 52 and are separated by radially disposed baffles 53.

Schematically illustrated in FIG. 4 is the x-y transport mechanism 24 shown in FIG. 1. A carriage 55 is moved in a y-direction by a micrometer drive 56 coupled to a synchronous motor 57 by a gear train 58. Also driven by the gear train 58 is a potentiometer 59 and a pair of cams 61 and 62 that operate, respectively, microswitches 63 and 64. Movement of the carriage 55 in an x-direction is produced by another micrometer drive 65 coupled to a stepping solenoid 66 by a gear train 67 that also drives another potentiometer 68. The relative x and y positions of the carriage 55 are indicated in a conventional manner by the outputs of the potentiometers 59 and 68.

Referring now to FIG. 5 there is shown in block diagram form circuit details of the analyzer circuit 29 shown in FIG. 1. The outputs of the photomultipliers 46–49 on lines 31–34, respectively, are fed into logarithmic amplifiers 70 and 72–74. Receiving the log outputs of the amplifiers 70 and 72 is a difference amplifier 75 that produces a first difference output signal on line 76. Similarly, the log outputs of the amplifiers 73 and 74 are applied to a difference amplifier 77 that produces a second difference signal on line 78. The first and second difference signals on lines 76 and 78 are summed in a summing amplifier 79 after being squared by, respectively, multipliers 80 and 80'. Receiving the output of the amplifier 79 on line 81 is a threshold circuit 82 that provides an input to a readout device 83.

In a typical application the embodiment 21 is used to produce line drawings of detail boundaries existing in either black and white or color transparencies. With a transparency 23 positioned on the x-y transport mechanism 24, the energy transmission system 22 and particularly the aperture 45 in the mask 35 transmits to the receiver 28 light energy emanating from a given area 40 (diagrammatically illustrated in FIG. 3) of the transparency. The light pipes 41–43 isolate portions of the transmitted energy emanating from each of four equal sized area sub-divisions diagrammatically represented by the sectors 41'–44' in FIG. 3. The light outputs isolated by the pipes 41–44 are received, respectively, by the photomultipliers 46–49 which, accordingly, produce on outputs lines 31–34 output signals dependent upon the light energy levels emanating from, the individual two-dimensionally spaced apart area sub-divisions 41'–44' of the given area 40. Having been modulated by the object detail in the transparency 23, the signal values on lines 31–34 are representative of that object detail.

Referring now to FIG. 5, it will be noted that the output signal 31 representing the energy level emanating from area sector 41' is subtracted from signal 33 representing the energy level emanating from diametrically opposed area section 43'. Thus, the output of the differential amplifier 75 on line 76 is dependent on any component of energy gradient in the direction designated by dotted line A in FIG. 3. Similarly, output signal 32 representing the energy level emanating from the area sector 42' is subtracted from output signal 34 representing the energy level emanating from the diametrically opposed area sector 44'. Consequently, the output of the difference amplifier 77 on line 78 is dependent on any component of energy gradient in the direction defined by dotted line B in FIG. 3. The summation of the squares of the signals on lines 76 and 78 in the summing amplifier 79 produces a gradient detection signal on line 81 dependent on the vector magnitude of any energy level gradient detected in the area 40. Furthermore, being a vector quantity the magnitude of the output signal on line 81 is independent of gradient orientation with respect to the mean direction of scan produced as described below. As noted above, however, the light energy levels emanating from the area sectors 41'–44' are determined by object detail in area 40 of the transparency 23. Consequently, the amplitude of the gradient detection signal on line 81 is dependent on the extent to which detail boundaries exist in the area 40.

The x-y transport mechanism 24 operates in a conventional manner to systematically scan the transparency 23 and thereby continuously change the given area thereof being examined for object detail boundaries. Typically, the synchronous motor 57 is energized to operate the micrometer drive 56 producing y-direction movement of the carriage 55. After a length of travel required for the transparency 23 to complete a full y-direction traversal of the light beam illustrated in FIG. 1, the cams 61 and 62, respectively, actuate the microswitches 63 and 64. Conventional circuitry (not shown) responds to actuation of the switches 63 and 64 by reversing the synchronous motor 57 and actuating the stepping solenoid 66 to produce a small displacement of the carriage 55 in the x-direction. Another traversal of the transparency 23 is then made along an opposite y-direction path slightly displaced in the x-direction. Thus, the transport mechanism 24 is effective to produce a scan of the transparency 23 along paths diagrammatically represented by lines 85 in FIG. 4. Because, as described above, the detection of energy gradients is independent of their orientation, the scan represented by lines 85 in FIG. 4 detects all detail boundaries of any orientation in the transparency 23 provided that the separation between scanning lines is suitably related to the size of the scanning area 40. The detail boundary detection sensitivity is determined, of course, by the reference voltage setting of the threshold circuit 82. Various mechanisms can be employed for the readout device 83 including, for example, a facsimile printer, a cathode ray tube or a mechanical plotter controlled by a tape and computer system.

The use of the log amplifiers 70 and 72–74 to establish a logarithmic response characteristic for the gradient detection signal is an important feature of the invention. The logarithmic amplifiers provide a step response to energy level gradients that is independent of signal level. For this reason the system 21 exhibits equal boundary detection sensitivity in both shadow and highlight areas of an object. The logarithmic response offers an additional advantage for applications desiring to approximate human response to a color display. Because color is a psychologically perceived attribute of light and psychological response is logarithmic in nature, the output produced by the logarithmic amplifiers for a color display closely parallels human visual response to that display.

Figure 6:
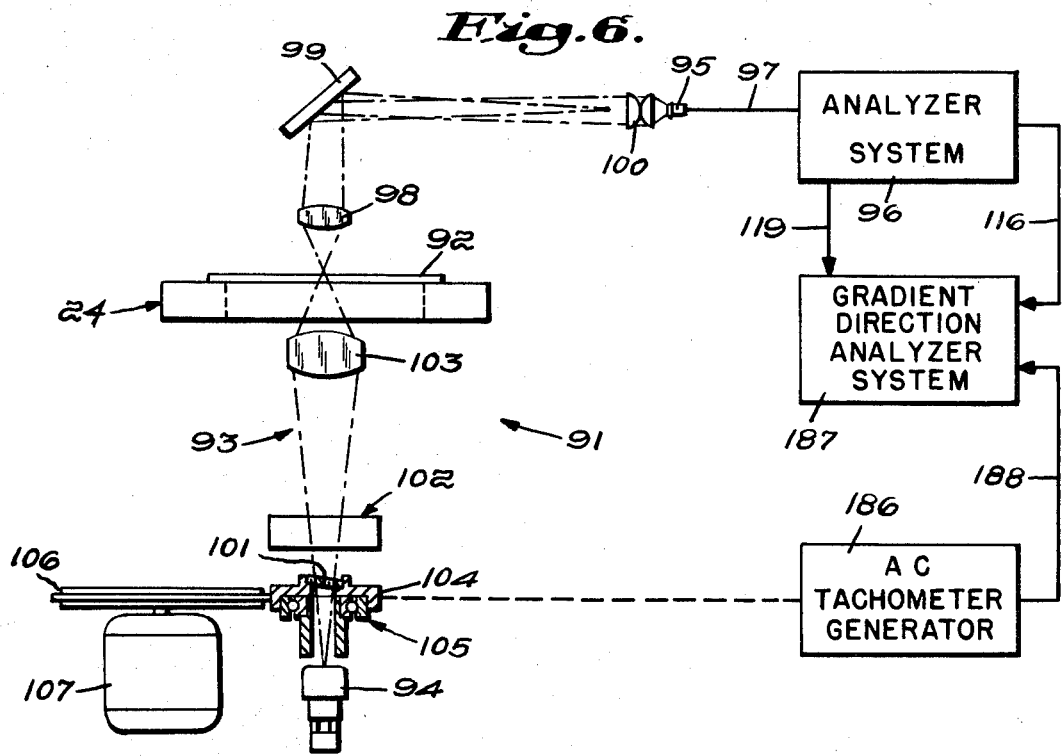
FIG. 6 is a schematic view of another preferred embodiment of the invention.

FIG. 6 illustrates another embodiment 91 in which an object such as a photographic transparency 92 is again mounted on the x-y transport mechanism 24 described above and shown in FIG. 4. An optical transmission system transmits light from an arc lamp 94, through the transparency 92 and to a receiver 95 that can be, for example, a photodiode. Included in the system 93 between the transparency 92 and the receiver 95 is a collection objective 98, a mirror 99 and a condenser assembly 100. Other components of the system 93 disposed between the transparency 92 and the lamp 94 are a tilt plate 101, a filter assembly 102 and an objective 103. The clear glass plate 101 is supported at a slight angle to a plane normal to the optical axis of the system 93 on a turntable 104 rotatably supported by a bearing assembly 105. Rotation of the table 104 is produced by a friction wheel 106 driven by a constant speed motor 107.

Figure 7:
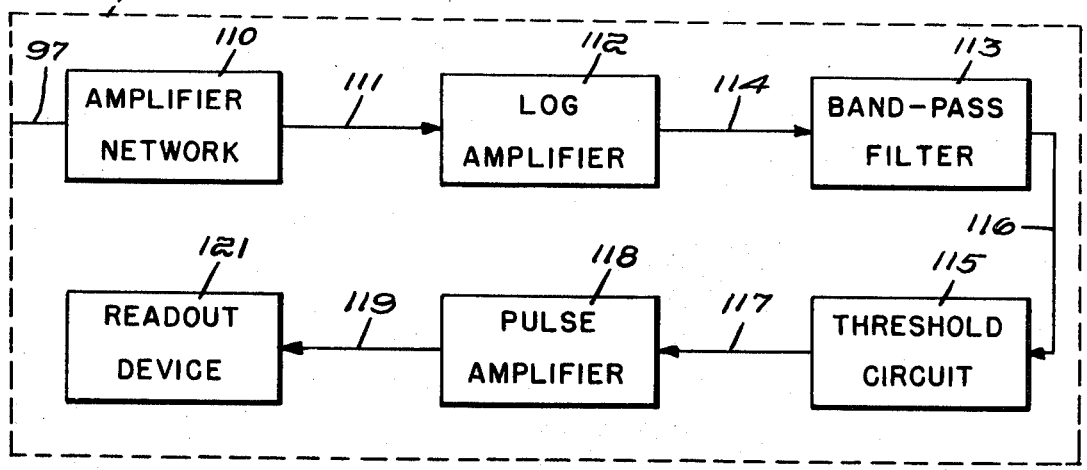
FIG. 7 is a schematic block diagram of an analyzer circuit for use with the embodiment shown in FIG. 6.

FIG. 7 illustrates in block diagram form circuit details of the analyzer circuit 96 shown in FIG. 6. The signal output of the photodiode 95 on line 97 is first preamplified in an amplifier network 110 and then applied on line 111 to a second amplifier 112 having logarithmic response. A band-pass filter circuit 113 receives the log amplifier output on line 114 and provides an input to a threshold detector circuit 115 on signal line 116. The output of the threshold circuit 115 on line 117 is amplified in a pulse amplifier 118 and then applied on line 119 to a readout device 121.

During operation of the embodiment 91, light produced by the lamp 94 is imaged as a spot on the transparency 92 by the objective 103 after passing through the tilt plate 101 and filter assembly 102. The filter assembly 102 controls the spectral distribution of light ultimately reaching the receiver 95 while the function of the plate 101 is described below. The object detail modulated light emanating from the transparency 92 is collected by the objective 98 and reflected by the mirror 99 to the condenser 100 that images the aperture of the objective 98 on the photodiode 95. This optical arrangement prevents variation in the location of the light distribution on the sensitive surface of the photodiode 95 despite the hereinbelow described light beam deviation created by the tilt plate 101.

Because of refraction, the tilt plate 101 deviates the apparent location of the spot of light created by the lamp 94 from the optical axis by an amount $\delta = t/n \sin \theta$, where $t$ is the thickness, $n$ the index of refraction and $\theta$ the angle of tilt. As the plate 101 is rotated by the friction disc 106, the deviation rotates with it so that the spot of light apparently rotates about the optical axis. The image of this spot on the transparency 92 is a spinning spot.

In a preferred arrangement of the embodiment 91, the tilt angle for the plate 101 is selected so that the spot rotates on the transparency 92 about a point on its circumference. Thus, as diagrammatically illustrated in FIG. 8 the spot will sequentially occupy positions represented by circles 131–133 as it spins within a given area 135 of the transparency 92. The amplitude of the output signal produced by the photodiode 95, therefore, will have instantaneous values dependent on the level of light energy emanating from the two-dimensionally spaced apart area sub-divisions 131–133 sequentially occupied in the area 135 by the spinning spot. The light levels emanating from the individual area sub-divisions are, of course, determined by the degree of light modulation produced by the object detail retained by those sub-divisions. Thus, the amplitude of the alternating signal produced on line 97 represents the density of object detail within the two-dimensionally spaced sub-divisions 131–133 sequentially occupied by the spot.

As in the embodiment described above, the x-y transport mechanism 24 is moved in conventional manner to systematically scan the transparency 92 and thereby continuously change the given area 135 therein being examined for object detail boundaries. Since the light energy levels emanating from the transparency are determined by the degree of object detail modulation occurring therein, object detail boundaries in a given area 135 will result in variations in the amplitude of the signal produced on line 97. Furthermore, because of its circular movement the light spot traverses each gradient in a given area in all directions so that if a signal increase occurs at one portion in a rotation cycle, a decrease will occur as the spot turns 180° and proceeds in the opposite direction. Object detail boundaries introduce on the output signal on line 97, therefore, an alternating component at the rotation frequency of the spinning spot.

Figure 9:
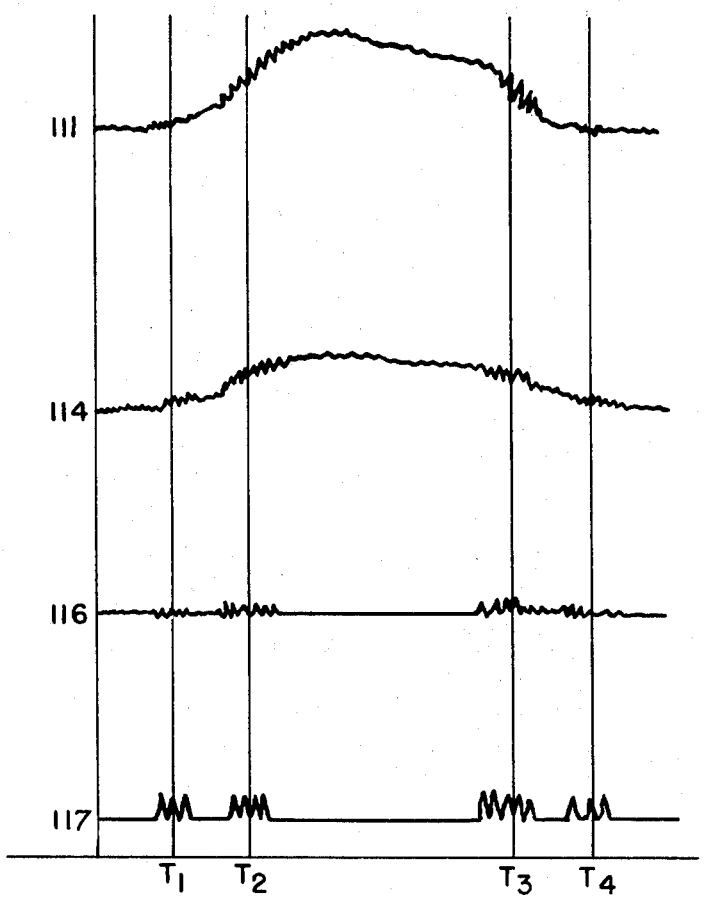
FIG. 9 is a diagram illustrating waveforms generated on various signal lines of the circuit shown in FIG. 7.

The operation of the analyzer circuit 96 will be described in connection with FIG. 9 which illustrates typical waveforms generated on signal lines shown in FIG. 7. The signal ripples shown on line 111 at times $T_1$–$T_4$ indicate the presence of an object detail boundary in an area being scanned. As noted above, the ripple frequency approximates the rotation frequency of the spinning spot. The larger amplitudes of the ripple at times $T_2$ and $T_3$ than at times $T_1$ and $T_4$ results from higher levels of light energy emanating from the particular areas being scanned at times $T_2$ and $T_3$. For example, the signal ripples detected at times $T_1$ and $T_4$ would typically represent a detail boundary in deep shadow regions of the transparency 23 while the signal ripples detected at times $T_2$ and $T_3$ would typically represent detail boundaries in highlight portions of the transparency. As shown by the waveform for signal line 114, this undesirable dependency on average emanating energy level is obviated by the log amplifier 112 that provides a ripple response that is substantially independent of average signal level. The bandpass filter 113, tuned to the rotation frequency of the spot, isolates the boundary produced ripples in the signal providing the waveform illustrated on line 116. Assuming that the signal values isolated by the bandpass filter 113 exceed the reference level in the threshold circuit 116, the illustrated waveform is produced on line 117 which after amplification in the amplifier 118 actuates the readout device 121.

The spinning spot detector embodiment 91, in being independent of boundary or energy gradient orientation simulates the behavior of a sum of squares quadrant detector embodiment 21 described above.

A brief proof follows: given a gradient grad $\overline{D} = dD/dr$ inclined to the scan direction, $\overline{x}$, by an angle $\theta$, and a spot whose motion is described by $x = vt + R \sin(\omega t + \phi)$ and $y = R \cos(\omega t + \phi)$, with $D = D_o$ at $x = y = 0$, the observed signal on line 114 will be $$D = D_o + dD/dr \, (x \cos\theta + y \sin\theta)$$

$$= D_o + dD/dr[vt\cos\theta + R \sin(\omega t + \phi + \theta)]$$

After filtering $D' = 1/\omega \, dD/dt$ the signal on line 116 becomes $$D' = dD/dr[v/\omega \cos\theta + R \cos(\omega t + \phi + \theta)]$$

In the case of the quadrant detector 21 the signal produced by each of the four detector elements 46–49 is $$Dx_1 = D_o + dD/dr \left(x + \frac{\Delta x}{2}\right) \cos\theta$$

$$Dx_2 = D_o + \frac{dD}{dr} \left(x - \frac{\Delta x}{2}\right) \cos\theta$$

$$Dy_1 = D_o + \frac{dD}{dr} \left(x \cos\theta + \frac{\Delta y}{2} \sin\theta\right)$$

$$Dy_2 = D_o - \frac{dD}{dr} \left(x \cos\theta - \frac{\Delta y}{2} \sin\theta\right)$$

On taking in the multipliers 80, 80' and amplifier 77 the sum of squares of the differences provided by the difference amplifiers 71 and 75 the signal is $$D' = \sqrt{(D_{x_1} - D_{x_2})^2 + (D_{y_1} - D_{y_2})^2}$$

$$= \frac{dD}{dr} \sqrt{(\Delta x)^2 \cos^2\theta + (\Delta y)^2 \sin^2\theta}$$

if $\Delta x = \Delta y$ this becomes $$D'_{quad} = dD/dr \, \Delta x$$

The conditions for which the methods are equal can be seen by comparing the results. Thus $D'_{quad} \approx D'_{spot}$ if $v/\omega << R$, for peak values of $\cos(\omega t + \phi + \theta)$. If the spot translation is small enough so that the display points merge, the methods are essentially equivalent.

Referring now to FIG. 10 there is shown another detail boundary detector embodiment 141. Again, a transmission system 142 transmits light energy from an object such as photographic transparency 143 to a photodetector receiver 144. The transmission system 142 includes a cathode ray tube 145, an objective 146 and a condenser assembly 147. Applying deflection therefore, to the horizontal and vertical deflection coils of the cathode ray tube 145 are, respectively, a summing amplifier 148 and a summing amplifier 149. The summing amplifier 148 combines the signal output of a horizontal sweep generator 151 with an ($a \cos \omega t$) signal produced on line 152 by an oscillator 153. The signal on line 152 is applied also to a phase shift network 154 providing an ($a \sin \omega t$) signal on line 155 that is combined in the summing amplifier 149 with the signal output of a vertical sweep generator 156. The gradient detection signal output of the photodetector 144 on line 157 is applied to an analyzer system 158 that is identical to the analyzer system 96 shown in FIG. 7.

During operation of the embodiment 141, the spot produced on the face of the cathode ray tube 145 is imaged on the transparency 143 by the objective 146. The object detail modulated light energy emanating from the transparency 143 is directed by the condenser assembly 147 to the photodetector 144. Application of the ($a \cos \omega t$) and ($a \sin \omega t$) signals to the deflection coils of the cathode ray tube 145 results in circular motion of the spot imaged on the transparency 143. The amplitude, $a$, of the signals produced on lines 152 and 155 is preferably chosen so as to produce spot movement of the type described above and diagrammatically illustrated in FIG. 8. Thus, the detection signal produced by the detector 144 on line 157 again will have an amplitude dependent on the energy levels emanating from two-dimensionally spaced apart subdivisions of a given area on the transparency 143. Scanning movement of the spinning spot along desired paths in the transparency 143 is provided in this embodiment by the application to the cathode ray tube 145 of suitable deflection signals produced in conventional manner by the horizontal and vertical sweep generators 151 and 156. The gradient detection signal on line 157 is analyzed in the analyzer system 158 in the manner described above in connection with embodiment 91.

FIG. 11 schematically illustrates another embodiment 161 similar to embodiment 141 shown in FIG. 10. Light produced by an arc lamp 162 is directed through a transparency 163 by a condenser 164 and an objective 165 produces an image of the object detail retained by the transparency 163 on the cathode 166 of an image dissector 167. A sweep control system 168 applies signals on lines 169 and 171 to deflection coils of the dissector tube 167. Receiving a gradient detection signal output of the dissector tube on line 172 is an analyzer system 173 again identical to the analyzer system 96 shown in FIG. 7.

The deflection signals produced by the sweep control system 168 on lines 169 and 171 are identical to those applied to the cathode ray tube 145 shown in FIG. 10. Thus, electrons are focused sequentially to the anode of the dissector tube 167 from circularly distributed spots on the cathode 166. Again, the size of the spot relative to its circular area of movement is preferably as diagrammatically illustrated in FIG. 8. Simultaneously, scan deflection signals systematically change the given circular area examined so as to completely scan the object detail of the transparency 163 imaged on the cathode 166. Variations in amplitude of the output signal on line 172 represent detail boundaries present in the scanned areas and are detected by the analyzer 173 in the manner described above in connection with the embodiment 91.

Figure 12:
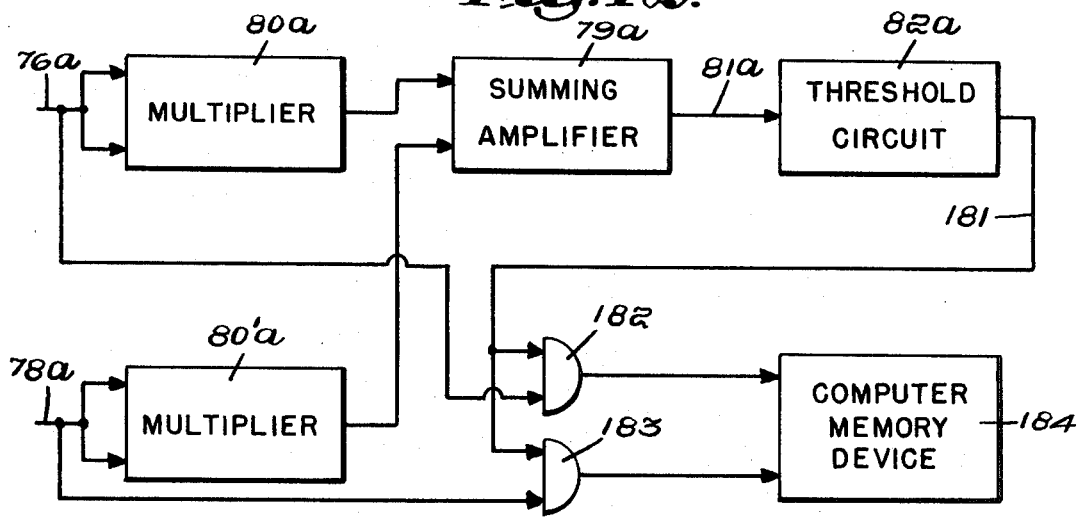
FIG. 12 illustrates a modified version of the circuit shown in FIG. 5.

FIG. 12 illustrates in block diagram form a modified gradient analyzer system for use with the embodiment 21 shown in FIGS. 1–5. The function of the circuitry shown in FIG. 12, which would be incorporated into the analyzer system 29 shown in FIG. 5, is to detect the relative orientation of detected detail boundaries. Components in FIG. 12 equivalent to those shown in FIG. 5 are identified by the same reference numerals and a suffix $a$. Thus, the outputs of the difference amplifiers 75 and 77 (FIG. 5) are shown in FIG. 12 applied to, respectively, multipliers 80a and 80'a on signal lines 76a and 78a. The multiplier outputs are again summed in a summing amplifier 79a, the output of which is applied to a threshold circuit 82a on signal line 81a. In this embodiment however, the outputs of the difference amplifiers on lines 76a and 78a, respectively, are applied in addition to AND gates 182 and 183. Also received by each of the AND gates 182 and 183 is the output of the threshold circuit 82a on signal line 181. A computer memory device 184 receives the output from both the AND gates 182 and 183.

During operation, the multipliers 80a and 80'a, the amplifier 79a and the threshold circuit 82a function as described above to produce a signal on line 181 representing detail boundaries detected during a scan of an object such as the transparency 23 shown in FIG. 1. That signal is used to gate the AND gates 182 and 183 which also receive, respectively, the signals on line 76a and 78a. As described above, the signal on line 76a indicates both the magnitude and sense of any detected energy gradient component, $\Delta A$, in the direction indicated by dotted line A in FIG. 3. Analogously, the signal on line 78a indicates both the magnitude and sense of any detected energy gradient component, $\Delta B$, in a direction indicated by dotted line B in FIG. 3. When the value of the detected gradient exceeds a predetermined level established by the threshold circuit 82a, the gates 182 and 183 are enabled to pass the signals representing gradient components $\Delta A$ and $\Delta B$ to the computer memory device 184 which determines the direction of the detected gradient vector by calculating the angle $\theta$, the tangent of which is $\Delta A / \Delta B$. Correlation in a conventional manner of the information produced by the computer memory device 184 and the position indicating outputs of the encoders 59 and 68 (FIG. 4) produces a record of orientations and relative positions of all detail boundaries present in the object being scanned. This information is useful, for example, for image analysis in applications of charactor recognition.

An A.C. tachometer generator 186 and a gradient direction analyzer system 187 shown in FIG. 6 determines in a similar manner the relative orientation of detail boundaries detected by the embodiment 91. The tachometer generator 186 is rotatably coupled to the turntable 104 and provides on output line 188 a sine wave output signal having a frequency equal to the rotational velocity of the tilt plate 101. That signal together with outputs of the analyzer system 96 on lines 116 and 119 are applied to the gradient detection analyzer system 187 described in greater detail below.

Figure 13:
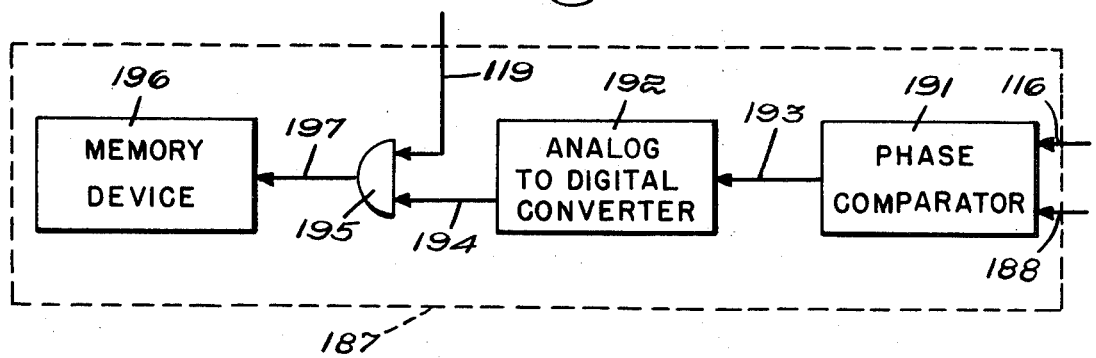
FIG. 13 is a block diagram of the direction analyzer system shown in FIG. 6.

FIG. 13 shows in block diagram form components present in the analyzer system 187 shown in FIG. 6. A phase comparator 191 produces on line 193 an analog signal dependent on measured phase difference between the input signals on line 116 and 188. The analog signal on line 193 is converted into digital form by the analog to digital converter 192. Receiving the digital output of the converter 192 on line 194 and an input signal on line 119 from the analyzer 96 (FIG. 7) is an AND gate 195. The output of the AND gate 195 is applied on line 197 to a memory device 196.

In describing operation of the direction analyzer system 187 reference is again made to the diagram shown in FIG. 8. As described above, detail boundaries encountered in an area 135 by a spinning spot result in the generation of an alternating signal at a frequency equal to the rotational velocity of the spot which is, of course, equal to the rotational velocity of the tilt plate 101 (FIG. 6). Such signals are isolated by the bandpass filter 113 (FIG. 7) and are applied on line 116 to the phase comparator 191 shown in FIG. 13. The phase of a gradient detection signal on line 116 is dependent upon the relative positions of the rotating spot within an area 135 when a detail boundary is encountered. These positions are in turn determined, determined, obviously, by the orientation of a detected detail boundary with respect to the scan direction. Thus, phase comparison between the signal on line 116 and the tachometer output reference signal on line 188 results in an analog signal on line 193 representing the relative orientation of a detected detail boundary. After conversion into digital form by the converter 192, that signal is applied by the AND gate 195 to the memory device 196 provided that the gate 195 is enabled by a signal on line 119. As described above, an output signal is produced on line 119 by the pulse amplifier 118 (FIG. 7) when a detected energy gradient is above a desired reference level established by the threshold circuit 115. The memory device 196 operates in a conventional manner to determine the detail boundary orientation represented by the digital output of the converter 192. Again, the relative location of a detected gradient in the scanned object is determined by suitably correlating the output of the AND gate 195 with the outputs of the position encoders 59 and 68 shown in FIG. 4. It will be obvious that the gradient direction analyzer system 187 can be used in an analogous manner with the embodiments 141 and 161 shown, respectively, in FIGS. 10 and 11. In those embodiments, the phase of a gradient detection signal produced in either of the analyzer systems 158 or 173 is compared with the reference signal generated by the oscillator 153 (FIG. 10).

Obviously, many modifications and variations of the present invention are possible in light of the above teachings. For example, although the described method for producing line drawings of photographic transparencies is a preferred application, it will be obvious that the detector embodiments disclosed can be used in many other applications. It is to be understood, therefore, that the invention can be practiced otherwise than as specifically described.

What is claimed is:

1. A system for detecting significant detail boundaries contained on an object and for producing lines representative of said detail boundaries comprising:
    a. means for systematically scanning said object;
    b. means for sequentially examining a large plurality of separate two-dimensional areas of said object during the scanning thereof, said examining means including:
        1. means for receiving the radiant energy emanating from a plurality of area sub-divisions of each of said two-dimensional areas and for producing a plurality of output signal values each of which are a function of the level of radiant energy emanating from a different one of said plurality of area sub-divisions; and
        2. means for analyzing said plurality of output signal values and for producing a gradient detection signal dependent upon differences between said plurality of output signal values, which differences result from and indicate the presence of one or more significant detail boundaries within each of said two-dimensional areas, said analyzing means further including gradient orientation detection means for detecting the orientation of said indicated detail boundaries within each of said two-dimensional areas independent of the direction of scan of said scanning means; and
    c. output means coupled to said analyzing means for producing lines representative of said significant detail boundaries.

2. A system according to claim 1 wherein said energy receiving means comprises radiant energy detection means for producing a plurality of output signals each having a value representing the level of radiant energy emanating from a different one of said area sub-divisions.

3. A system according to claim 2 wherein said analyzing means comprises difference circuit means for producing said gradient detection signal dependent upon differences between the values of said plurality of output signals.

4. A system according to claim 3 wherein said analyzing means further comprises polarity control circuit means for establishing a constant polarity for said gradient detection signal.

5. A system according to claim 4 wherein said analyzing means comprises logarithmic circuit means for providing said gradient detection signal with a logarithmic response characteristic.

6. A system according to claim 4 wherein said analyzing comprises threshold means for producing said gradient detection signal in response to the signal value differences detected by said difference circuit means.

7. A system according to claim 2 wherein said radiant energy detection means comprises individual radiant energy detectors receiving energy emanating from each of said area sub-divisions and for producing said plurality of output signals.

8. A system according to claim 7 wherein said energy receiving means comprises a plurality of separate radiant energy transmission paths for isolating the radiant energy emanating from each of the plurality of area sub-divisions and for transmitting said isolated radiant energy to a different one of said individual radiant energy detectors.

9. A system according to claim 7 wherein said analyzing means comprises logarithmic circuit means for providing said gradient detection signal with a logarithmic response characteristic.

10. A system according to claim 7 wherein said area sub-divisions lie in quadrant portions of each of said two-dimensional areas and wherein said analyzing means comprises difference circuit means for producing a first signal dependent on the difference between the values of said output signals representing radiant energy levels from one diagonal set of said quadrant portions and a second signal dependent on the difference between the values of said output signals representing radiant energy levels from the other diagonal set of said quadrant portions.

11. A system according to claim 10 wherein said analyzing means comprises a polarity control circuit means for establishing a constant polarity for said first and second signals.

12. A system according to claim 11 wherein said polarity control circuit means comprises squaring circuit means for squaring said first and second signals.

13. A system according to claim 12 wherein said analyzing means comprises summing circuit means for adding the values of said first and second signals to produce said gradient detection signal.

14. A system according to claim 1 wherein said energy receiving means includes sweep control means for sequentially changing said area sub-division of each of said two-dimensional areas from which emanating radiant energy is received by said energy receiving means, said energy receiving means further including means for producing an alternating signal output with an amplitude varying in response to varying energy levels emanating from said sequentially changing area sub-divisions.

15. A system according to claim 14 wherein said analyzing means comprises logarithmic circuit means for providing said gradient detection signal with a logarithmic response characteristic.

16. A system according to claim 14 wherein said sweep control means comprises a frequency control means for providing a constant frequency for said sequential changes in the area sub-divisions from which radiant energy is received by said energy receiving means.

17. A system according to claim 16 wherein said analyzing comprises band-pass filter means for isolating a given frequency band component of said alternating signal output.

18. A system according to claim 17 wherein said sweep control means comprises an energy beam that selects said sequentially changing area sub-divisions, and cyclical means for moving said beam in a path that selects annularly distributed area sub-divisions in said given areas.

19. A system according to claim 18 wherein said analyzing comprises a threshold means that receives the output of said band-pass filter means and produces said gradient detection signal.

20. A system according to claim 18 wherein said sweep control means comprises cyclical means for moving said beam in a substantially circular path on said object.

21. A system according to claim 20 wherein said sweep control means comprises a cathode ray tube, said energy beam comprises a light beam produced by said cathode ray tube and directed onto said object so as to generate said radiant energy emanating therefrom, said cyclical means comprise deflection control circuit means coupled to deflection coils of said cathode ray tube and adapted to produce said substantially circular motion of said light beam on said object, and said scanning control means comprise raster generator means coupled to said deflection coils of said cathode ray tube.

22. A system according to claim 20 wherein said sweep control means comprises:
a. lamp means for directing a focussed beam of radiation onto said object;
b. a tilt plate positioned between said lamp means and said object through which said beam passes; and
c. means for rotating said tilt plate for moving said beam in a substantially circular path on said object.

23. A system according to claim 17 including a camera tube and wherein said energy receiving means comprises the anode of said camera tube, and optical means for producing an optical image of said object on the cathode of said camera tube, said sweep control means comprises deflection means of said camera tube, said cyclical means comprise deflection control circuit means coupled to said deflection electrodes and adapted to deflect electrons from circularly distributed area sub-divisions of given areas on said cathode, and said scanning control means comprise raster generator means coupled to said deflection electrodes.

24. A system according to claim 23 wherein said frequency control means produces a reference phase signal of said constant frequency, and said gradient orientation detection means comprises phase comparison means for comparing the phases of said reference phase signal and said given frequency band component.

25. A system according to claim 1 wherein said area sub-divisions lie in quadrant portions of said two-dimensional area, said radiant energy receiving means comprises radiant energy detectors receiving energy emanating from each of said quadrant portions and producing output signals each having a value representing the level of radiant energy emanating from a different one of said quadrant portions and said analyzing means comprises difference circuit means for producing a first signal dependent on the difference between the values of said output signals representing radiant energy levels from one diagonal set of said quadrant portions and a second signal dependent on the difference between the values of said output signals representing radiant energy levels from the other diagonal set of said quadrant portions.

26. A system according to claim 25 wherein said gradient orientation detection means comprises means for determining the value ratios between said first and second signals.

* * * * *